United States Patent [19]

Lephilibert

[11] Patent Number: 4,773,442

[45] Date of Patent: Sep. 27, 1988

[54] GLOBE VALVE HAVING A DISMOUNTABLE SEAT FOR RAPID MAINTENANCE

[75] Inventor: Jean Lephilibert, Levallois-Perret, France

[73] Assignee: Sereg S.A., Montrouge, France

[21] Appl. No.: 110,081

[22] Filed: Oct. 16, 1987

Related U.S. Application Data

[63] Continuation of Ser. No. 779,405, Sep. 24, 1985, abandoned.

[30] Foreign Application Priority Data

Sep. 26, 1984 [FR] France ................. 84 14766

[51] Int. Cl.$^4$ ................. F16K 43/00; F16K 41/04
[52] U.S. Cl. ................. 137/315; 137/454.6; 251/214; 251/267; 251/278; 251/362; 251/363; 277/106
[58] Field of Search ................. 137/315, 454.5, 454.6; 251/214, 266, 267, 275, 276, 278; 277/362, 363, 105, 106

[56] References Cited

U.S. PATENT DOCUMENTS

| | | | |
|---|---|---|---|
| 1,011,236 | 12/1911 | Norris | 277/106 |
| 1,602,443 | 10/1926 | Moyer | 251/267 |
| 1,916,738 | 7/1933 | Miller et al. | 251/267 |
| 3,006,361 | 10/1961 | Reinemann | 137/454.5 |
| 3,648,718 | 3/1972 | Curran | 137/315 |
| 4,232,695 | 11/1980 | Roberge | 251/267 |
| 4,444,220 | 4/1984 | Seger | 251/214 |
| 4,469,123 | 9/1984 | Merrill | 137/454.6 |

FOREIGN PATENT DOCUMENTS

| | | | |
|---|---|---|---|
| 1332069 | 12/1963 | France | 251/214 |
| 2253462 | 3/1974 | Fed. Rep. of Germany | 251/214 |
| 736486 | 9/1955 | United Kingdom | 251/214 |

Primary Examiner—George L. Walton
Attorney, Agent, or Firm—Dale V. Gaudier

[57] ABSTRACT

A globe valve comprising: a control rod (70) which is movable in translation along a valve axis (XX'), handle means (90) for controlling movements of said rod in translation, a disk (74) fixed to one end of said rod; a body (12) having an inlet passage (14) and an outlet passage (16) therethrough for passing a liquid, said passages giving access to a cavity (18) which is extended via a cylindrical orifice (22) disposed along said valve axis in order to receive said rod; a cage (36) lodged inside said cavity and within which said disk is capable of being moved by axial displacement of said rod; packing (46) surrounding a portion of said rod and disposed within said cylindrical orifice; a seat (28) which is removable from said body for cooperating with said disk in a closure position, said seat having a first face defining a sealing bearing surface for cooperating with said disk and a first annular thrust bearing orifice, and a second face defining a second annular thrust bearing surface; means for defining a third annular thrust bearing surface symmetrically about said axis and disposed in said cavity between the openings to said passages and at least substantially fixed relative to said body; means (26) for providing sealing between said second and third annular thrust bearing surfaces; and compression means (50), said compression means acting on a stack having the same axis as the said valve body and comprising: said packing, said cage, said seat, and said sealing means, whereby said packing and said sealing means are subjected to said compression in order to provide sealing respectively between said rod and the wall of said cylindrical orifice through the body, and between said seat and said body.

10 Claims, 5 Drawing Sheets

GLOBE VALVE HAVING A DISMOUNTABLE SEAT FOR RAPID MAINTENANCE

This application is a continuation of application Ser. No. 779,405, filed Sept. 24, 1985, now abandoned.

The present invention relates to a globe valve having a dismountable seat for rapid maintenance.

BACKGROUND OF THE INVENTION

More precisely, the present invention relates to a globe valve which is usable, in particular, in nuclear installations and which is easy to disassemble, and in particular its seat is easy to disassemble.

In nuclear reactors of the pressurized water type, the energy produced by the fission reaction of the nuclear material in the core of the reactor is transmitted to a primary heat exchanger by a primary flow of water between the reactor vessel and the primary heat exchanger. Although the fuel material is enclosed in sheathing for preventing loss fuel material, there is always the possibility of cracks appearing in said sheathing, thereby allowing fission products to escape into the primary water. It is thus necessary for all the parts of the primary circuit to provide excellent confinement.

Further, it is known that in this type of nuclear installation, the primary circuit assembly is enclosed in a confinement chamber having a certain amount of radiation propagating therein. Human intervention inside the confinement chamber must thus be unusual and must take as little time as possible, in other words any act that needs to be performed on any of the components of the primary circuit must be easy to perform. Furthermore, it is important to have advance knowledge of the approximate duration of any such act.

Finally, because of the radiation which exits inside the primary reaction vessel, and in particular because of neutron radiation, it is extremely desirable for the primary water to contain no particles of material likely to give rise to radioactive products. It is thus necessary to ensure that none of the components of the primary circuit is made of a material likely to give rise to radioactive products under the effect of such radiation. This applies, in particular, to cobalt.

In such applications, current implementations of globe valves having compressed packing generally comprise a housing of embossed stainless steel constituted by a body and a yoke cap which are screwed and welded together, with the weld providing static external sealing.

In current embodiments, with the seat metallurgically deposited on the body, it is not possible to change the shape and the nature of the sealing bearing-surface since the apparatus is welded to its pipe-work in order to fit it better to local working conditions, for example.

It should also be observed in current implementations that lapping the seat of a valve which is already in place in its circuit requires a long and difficult prior operation for displacing the valve head. Special tools are required for grinding away the weld on the sealing lips and for unscrewing the yoke-cap. Finally, this type of action can generally be done no more than three times, because the lips are so small.

Further, it should be observed that reconditioning the packing is generally long and difficult, since it requires an extraction tool and since the replacement sealing rings must necessarily be split, which considerably reduces their effectiveness.

Three principal criteria can be selected from the various criteria that need to be satisfied by valves mounted in various parts of the primary circuit of such a nuclear reactor. It is necessary for the seat of the valve or for its packing to be rapidly changeable by means of simple operations. It is necessary that the valve should not constitute a weak point in maintaining the confinement of the primary circuit, in other words the valve must provide excellent sealing, in particular relative to the outside. Finally, it is necessary to avoid using materials in the valve assembly which are liable to produce radioactive products under the effects of radiation.

Given these requirements, a main object of the present invention is to provide a globe valve from which it is easy to extract the seat and packing while still maintaining good sealing, and to provide a valve which avoids using any cobalt.

SUMMARY OF THE INVENTION

To achieve this object, a globe valve in accordance with the invention comprises a control rod for translation along the axis of the valve, handle means for controlling the translation motion of the rod, a disk fixed to one end of the rod, a body having a liquid inlet passage and a liquid outlet pasage therein, both communicating with a cavity which is extended by a cylindrical orifice disposed along the axis of the valve to allow the rod to pass therealong, a cage lodged in the cavity and in which the disk is capable of being displaced under the action of the rod, packing means surrounding a portion of the rod, and a seat for co-operating with the disk in the closed position. Further, the seat is made from a part which is distinct from the body and which has a first face defining a sealing bearing surface for co-operating with the disk and a first thrust bearing surface, said bearing surfaces being annular and coaxial, and a second face defining a second annular thrust bearing surface, with the packing being disposed in the cylindrical orifice; in addition the valve comprises means for defining a third annular thrust bearing surface having circular symmetry around the axis and disposed in the cavity between the opening of the passages and at least substantially fixed relative to the body, means for providing sealing between the second and third annular bearing surfaces, and compression means, the compression means acting on a stack having the same axis as the body of the valve and comprising the packing, the cage, the seat, and the sealing means, whereby the packing and the sealing means are subjected to compression in order to provide sealing respectively between the rod and the wall of the cylindrical orifice of the body, and between the seat and the body.

It can thus be seen that the head and the seat of the valve may easily be extracted from the body of the valve without using special tools, thereby enabling these parts to be exchanged or reconditioned in a workshop rather than on site.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

Figure 1:
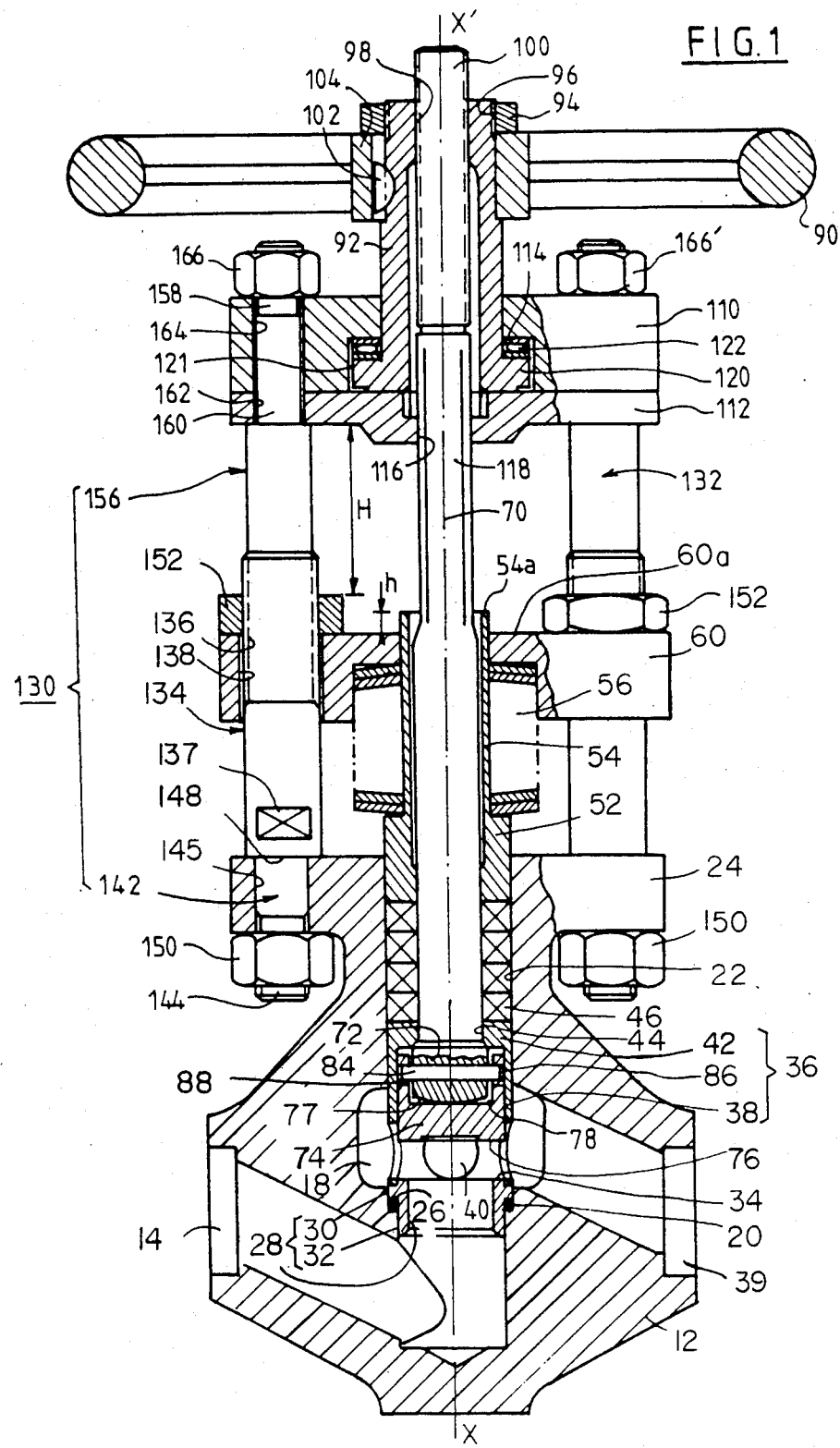
FIG. 1 is a vertical section through a globe valve having a simple cage and a dismountable seat.

FIG. 1 shows a first embodiment of a globe valve in accordance with the invention, and this valve includes a one-part cage. The valve comprises a body 12 having an inlet passage 14 and an outlet passage 16 which are interconnected by a cavity 18 disposed along the axis XX' of the valve. Between the passages 14 and 16, the cavity 18 has a shoulder 20 which is preferably frusto-conical in shape about the axis XX'. The cavity 18 extends beyond the outlet passage 16 via a cylindrical bore 22 along the axis XX'. The top part of the valve body 12 around the bore 22 has a fixing flange 24. Inside the cavity 18, the valve includes an annular sealing gasket 26 which is preferably made of graphite and which has a plane upper face and a frusto-conical lower face which rests on the shoulder 20 constituting a thrust bearing surface. The sealing gasket 26 provides sealing between the body 12 of the valve and a removable seat 28 constituted by a sleeve 30 having an outwardly directed collar 32. The lower face of the collar 32 constitutes an annular thrust bearing surface via which the seat rests on the top face of the sealing gasket 26. The upper annular face of the sleeve 30, referenced 34, constitutes the sealing bearing surface of the seat. The seat 28 is held in place by a cage 36 received in the cavity 18 and centered by the bore 22. The cage 36 has a cylindrical side wall in the form of a sleeve 38 having orifices such as 40 passing therethrough to provide communication between the cavity 18 and the outlet passage 16 while the valve is in the open position. The cage 36 is closed at its upper end by a base 42 which is pierced by an orifice 44 whose diameter is less than the inside diameter of the sleeve 38 of the cage 36 and which serves to center the rod 70.

The lower face 39 of the sleeve 38 rests on the upper face of the collar 32 which thus constitutes an annular thrust bearing surface about the axis XX'.

Above the cage 36, the valve includes a stack of non-split annular packing rings such as 46 which are received in the bore 22 and which are thrust against the upper face 48 of the cage 36. These packing rings are preferably made of expanded and embossed graphite. Above the packing 46, and partially engaged in the bore 22, there is a ram or packing press 50 having a lower portion 52 whose outside diameter is greater than the outside diameter of the upper portion 54 thereof. The upper portion 54 of the ram serves to center a stack of resilient washers such as 56. The stack constituted by the sealing ring 26, the seat 28, the cage 36, the packing rings 46, the ram 50, and the resilient washers 56 is pressed against the shoulder 20 by means of a thrust surface on a ram 60 which has an axial hole 62 centered on the upper portion 54 of the ram 50. The thrust surface of the ram 60 is fixed to the flange 24 of the valve body by means which are described below in order to compress the resilient washers 56 with a given force.

Inside the axial passage formed by the axial holes through the ram 50 and the packing rings 46 and by the orifice 44 through the cage, a control rod 70 is capable of sliding, which rod has a bottom end 72 whose diameter is greater than the remainder of the rod 70. The outside diameter of the end 72 of the rod is also greater than the diameter of the opening 44. The bottom end 72 of the rod is fixed to a disk 74. The bottom face of the disk 74 has a lapped annular bearing surface 76 which co-operates with the sealing bearing surface 34 of the seat 28 when the valve is in the closed position. The top portion of the disk 74 has a hollow 78 into which the end 72 of the rod is inserted. The bottom face 80 of the end 72 of the rod is in the shape of a spherical cap 77 and co-operates with the flat base of the hollow 78 in the disk. The rod 70 is fixed to the disk by means of a cross-pin 84 passing through the end 78 of the rod and engaging two aligned holes 86 and 88 provided in the skirt of the disk 74. The pin 84 is orthogonal to the axis XX' of the valve. Further, the diameter of the holes 86 and 88 is slightly greater than the diameter of the pin 84.

Because of the play between the pin 86 and disk 74, the spherically shaped end of the rod 72 comes into contact with the flat space of the hollow 78 in the disk. This ensures that possible loss of parallelism between the bearing surface 76 of the disk and the sealing bearing surface 34 of the disk 28 can be taken up.

The rod 70 is operated by means of an assembly comprising a wheel 90 fixed to rotate and to translate with a thimble 92. These parts are fixed together by means of a nut 94 screwed onto a threaded top portion 96 of the thimble 92. The top portion of the thimble includes a tapped axial orifice 98 which co-operates with a threaded end 100 of the rod 70. The thimble 92 is caused to rotate with the wheel 90 by means of a key 102 engaged in a radial slot in the thimble 92 and in a slot in the hub 104 of the wheel. Axial displacement of the thimble 92 is limited by an assembly comprising an upper plate 110 and a lower plate 112. The upper plate 110 has an axial hole fitted with a shoulder 114. The lower plate 112 is fitted with an axial hole 116 having a square or toothed right section which co-operates with an intermediate portion 118 of the rod 70 which has a matching square or toothed right cross-section. This arrangement presents the rod 70 from rotating. The bottom end of the thimble 92 has a flange 120 which is held captive in a hollow 121 between the plates 110 and 112. Ball or roller bearings such as 122 are interposed between the top face of the flange 120 and the upper plate 110.

It should be observed that the rod 70 is guided in translation by the orifice 116 in the lower plate 112 and by the orifice 44 at the bottom of the cage 36.

Still with reference to FIG. 1, there follows a description of a first manner of fixing the flange 24 on the valve body 12 to the plate on the ram 60 and to the two plates 110 and 112 in which the thimble 92 is mounted. This is provided by two tiebars 130 and 132 which are fitted with wrench-receiving flats referenced 137. Since the two tiebars are identical, only the tiebar 130 is described in detail. It comprises a central portion 134 which is threaded in part at 136 and which is engaged in one of two holes 138 and 140 provided through the plate of the ram 60. The tiebar 130 has a lower portion 142 whose end 144 is threaded. The diameter of the lower portion 142 is less than the diameter of the central portion 134. The lower portion 142 is engaged and centered in one of two holes 145 through the flange 42 of the valve body 12. The difference in diameter between the central portion 134 and the lower portion 142 of the tiebar 130 defines a shoulder 148 which is thrust against the top face 24a of the flange 24. The threaded end 144 of the tiebar projects through the hole 145 and co-operates with a nut 150. Thus, the bottom end of each of the tiebars 130 and 132 is fixed to the flange 24. The tiebars 130 and 132 are parallel to the control rod 70.

The threaded portion 136 in the middle 134 of the tiebar 130 is situated in part above the plate of the ram 60. A nut 152 screwed onto the threaded portion 136 bears against the top face 60a of the plate on the ram 60.

Finally, the tiebar 130 includes an upper portion 156 having a threaded end 158. The diameter of the upper portion 156 is less than the diameter of the central portion 134. This difference in diameter defines a further shoulder 160. The upper portion 156 passes through holes 162 and 164 through the lower and upper plates 112 and 110 in which the thimble 92 is mounted. The lower plate 110 rests on the shoulder 160 and a nut 166 screwed onto the threaded end 158 of the tiebar fixes the plates 110 and 112 to each other and also fixes the assembly constituted by said two plates to the top end of the tiebar 130.

In like manner, the bottom of the tiebar 132 is fixed to the flange 24 by the nut 150' and the top end of the tiebar 132 is fixed to the assembly constituted by the plates 110 and 112 by means of a nut 166'. Further, a nut 152' corresponding to the nut 152 is screwed onto the central threaded portion of the tiebar 132 and bears against the top face 60a of the plate on the ram 60.

It will be understood that by tightening the nut 152 and 152' to a greater or lesser extent it is possible to compress the resilient washers 56 to a greater or lesser extent and thus to obtain a specified force on the packing 46 which provides external sealing, and on the static sealing ring 26 which provides internal sealing between the body 12 and the seat 28, with the compression of the washers being detectable by the distance h between the top end 54a of the packing ram 52 and the top face 60a of the plate on the ram 60.

It must be emphasized that in order to increase the static pressure on the sealing ring 26 as transmitted by the packing 46, the areas of the packing rings perpendicular to the axis XX' are considerably greater than the corresponding area of the sealing ring 26. For example, for a valve having a seat diameter of 25 mm, the area ratio is 2.5. Further, the resilient system constituted by the washers 56 has the function of compensating for any extrusion of graphite which may take place from the packing ring 46 along the rod 70.

The operation of the globe valve is clear from the above description. In the open position as shown in FIG. 1 the disk 74 is in the high position, liquid enters the cavity 18 via the inlet passage 14 and flows into the outlet passage 16 via the orifices 40 through the cage 36. To interrupt the flow of liquid, the wheel 90 is turned in the clockwise direction causing the thimble 92 to turn and thereby lowering the rod 70 and thus lowering the disk 74. The wheel 90 is turned until the annular bearing surface 76 of the disk comes into contact with the bearing surface 34 of the seat 28 at the desired pressure. It may be observed that this closing pressure increases the pressure exerted on the gasket 26 and further improves sealing.

In order to remove the valve head and replace the packing 46, for example, the procedure is as follows: the nuts 152 and 152' are unscrewed thus releasing the plates of the ram 60 to move in translation along the tiebars 130 and 132. The wheel 90 is then turned counter-clockwise in order to raise the rod 70. The rod rises freely until its shoulder 72 abuts against the base 42 of the cage 36. From this position, any further lifting of the rod 70 also lifts the cage 36, the packing 46, the ram 50, the resilient washers 56, and finally the ram 60. This entire assembly is capable of being raised by the wheel 90 only because the nuts 152 and 152' have been completely unscrewed. The lifting movement comes to an end when the nuts 152 and 152' abut against the plate 112. In order to ensure that all of the packing 46 has been removed from its housing when the assembly reaches this disposition, it is only necessary to ensure that a suitable distance H is provided between the nuts 152 and 152' in their operating position and the plate 112.

The valve head can then be completely removed by unscrewing the nuts 166 and 166', thus allowing the seat 28 and the gasket 26 to be removed. This operation does not require any special tooling since there is no longer any friction force between the packing 46 and its housing.

The valve shown in FIG. 1 has an internal leakage rate of less than 0.1 $cm^3/h$ under operating pressure, and its head loss coefficient K when fully open is less than 6.

Figure 2:
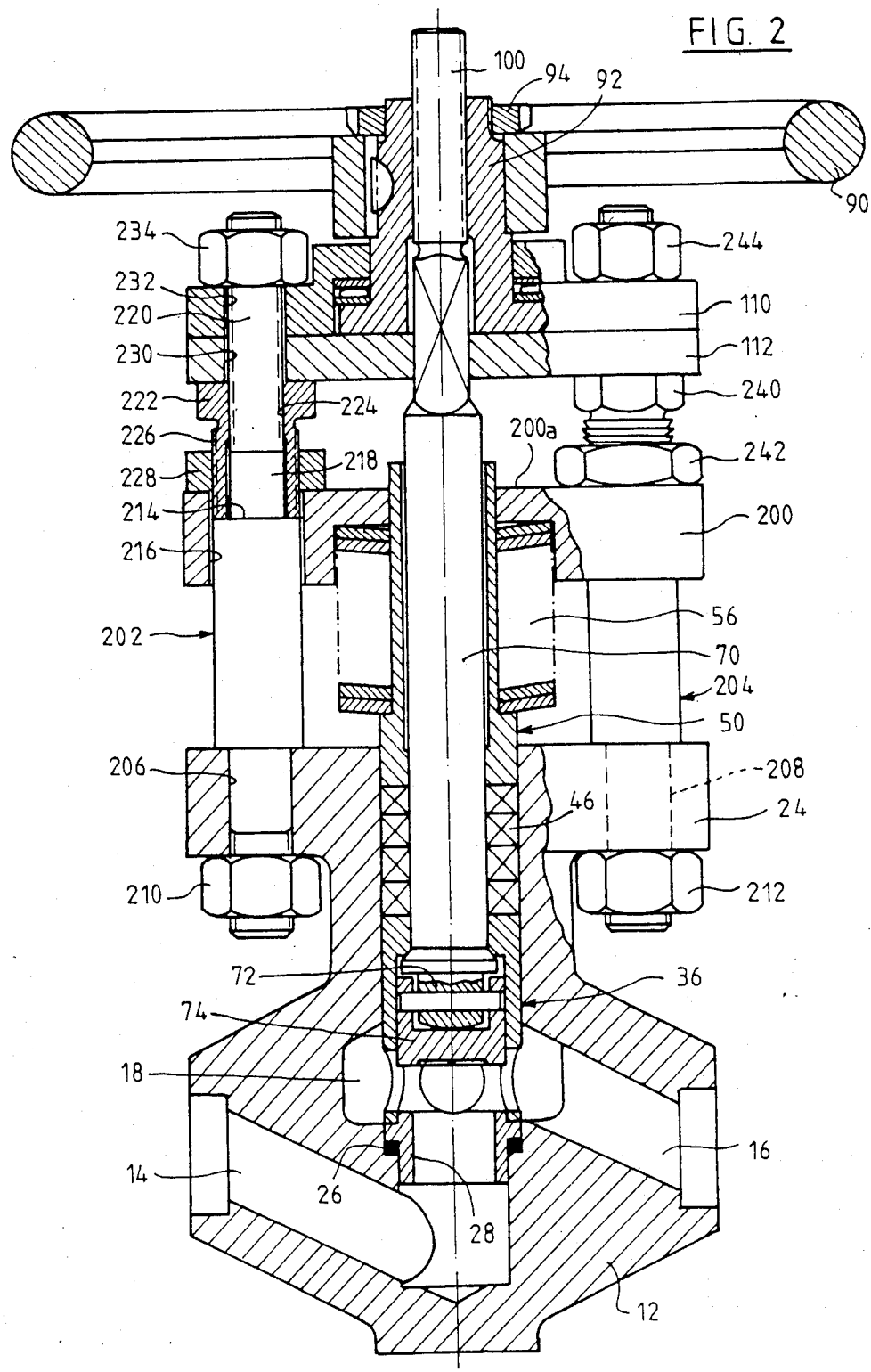
FIG. 2 is a vertical section through a portion of a first variant valve having a dismountable seat.

Reference is now made to FIG. 2 to describe a first variant embodiment of the valve. This variant differs from the first embodiment only in the manner by which the ram drive plate is fixed to the body of the valve. This is thus the only portion of the first variant which is described in detail. The ram plate, referenced 200 in FIG. 2, is mounted on two identical tiebars 202 and 204. The bottom end of each tiebar is engaged in a corresponding hole 206, 208 provided in the flange 24 on the body of the valve. The bottom ends of the tiebars are fixed to the flange 24 by means of nuts 210 and 212, and the tiebars are maintained parallel to the control rod 70 in a manner which is similar to that described for fixing the bottom ends of the tiebars 130 and 132 in FIG. 1.

As can be seen in FIG. 2, the tiebar 202 has a shoulder 214 situated inside a hole 216 through the ram plate 200. Above this shoulder 214 the tiebar 202 has a non-threaded portion 218 and a threaded end 220. A long nut 222 has a tapped bore 224 and an outer thread 226. The nut 222 is screwed onto the threaded end 220 of the tiebar until the bottom end of the nut abuts against the shoulder 214. A second 228 is then screwed on the outer thread of the long nut 222. The nut 228 is in contact with the top face 200a of the ram plate 200. It serves to regulate the force applied by the ram plate 200 on the resilient washers 56, as already explained with reference to FIG. 1.

The upper threaded end 220 of the tiebar 202 passes through holes 230 and 232 provided through the plates 112 and 110 which engage the thimble 92 which is fixed to the wheel 90. The plate 112 bears against the top end of the long nut 222. A nut 234 screwed onto the threaded end 220 of the tiebar serves to fix the plates 110 and 112 to the top end of the tiebar 202. The other tiebar 204 is mounted in the same manner and is associated with a long nut 240 having a nut 242 screwed thereon. Finally, a nut 244 is screwed onto the top end of the tiebar 204.

In this embodiment the valve head is extracted by rotating the wheel counter-clockwise so that the rod 70 comes into abutment travelling upwardly, and then by removing the nuts 234 and 244, and finally by unscrewing the long nuts 222 and 240 which serve as extractor means.

Figure 3:
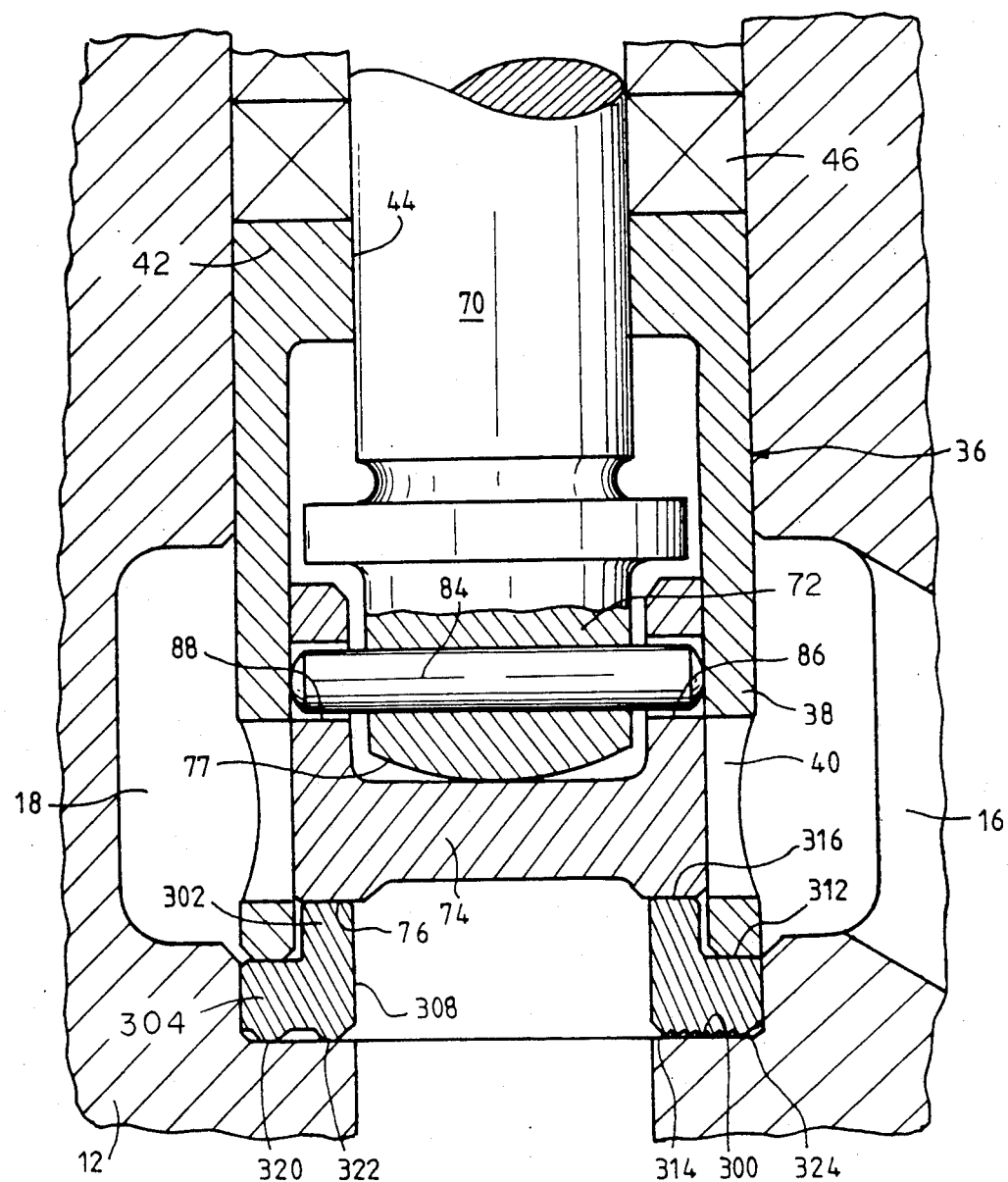
FIG. 3 is a vertical section through a portion of a variant embodiment of the valve, showing more particularly one specific way of providing sealing between the body and the seat of the valve.

FIG. 3 shows a portion of a second variant of a valve in accordance with the invention. In this variant the removable seat of the disk rests directly against the body of the valve. Only those portions of FIG. 3 which differ from the embodiment of FIG. 1 are described in detail, with portions which are common to both figures bearing the same reference numerals.

The cavity 18 which puts the inlet and outlet passages 14 and 16 into communication with each other is provided with a shoulder 300 located in a plane which is perpendicular to the axis XX' of the valve and which forms an annular thrust bearing surface. A removable seat 302 is directly received on the shoulder 300, and is itself symmetrical about the axis XX'.

The seat 302 comprises a bottom portion 304 which is wider than its top portion 306. The portions 304 and 306 of the seat are delimited on the inside by a common cylindrical face 308 about the axis XX'. The bottom portion 304 is delimited on the outside by a cylindrical surface whose radius is such that the portion 304 is fitted against the side wall of the cavity 18 with an H9 g6 fit.

The top portion 306 of the seat 302 is delimited on the outside by a cylindrical surface 312 of smaller radius than the radius of the surface 310. This difference in radius defines an annular thrust bearing surface 312 disposed in a plane perpendicular to the axis XX'. The bottom portion 304 of the seat 302 is delimited at the bottom by a face 314, and the top portion 306 is delimited at the top by a face 316, with the faces 314 and 316 being perpendicular to the axis XX'. The top face 316 constitutes the sealing bearing surface of the seat 302 and the annular zone 76 of the disk 74 is applied there against when the valve is in the closed position. The bottom face 314 provides sealing between the seat 302 and the body 12 of the valve.

The face 314 is provided with projections which, in cooperation with the shoulder 300, provide the desired degree of the sealing. In order to do this, the bottom end of the sleeve 38 of the cage 36 is applied against the shoulder 312. As has already been described with reference to FIG. 1, the resilient washers 56 exert a degree of force downwardly on the cage 36 via the ram 50 and packing 46. These items are not visible in FIG. 3.

Returning to bottom face 314 of the seat 302, it can be seen that the projections which provide sealing may be constituted by two annular lips 320 and 322 having edges at 120° (see left-hand side of FIG. 3). The crests of the lips 320 and 322 are centered on the mid portions of the shoulder 312 and the top face 316 of the seat 302, respectively. In another embodiment (see right-hand side of FIG. 3) the projections consist in annular ribs 324 which extend substantially over the entire bottom face 314 of the seat 302. When the valve is in the open position, the seat 302 is maintained in place by the cage 36. When the valve is in the closed position force from the disk 74 is added to that from the cage 36 thereby providing good sealing in spite of there being no sealing gasket.

The manner in which the seat 302 is mounted could equally well be applied to the variant valve shown in FIG. 2.

Figure 4:
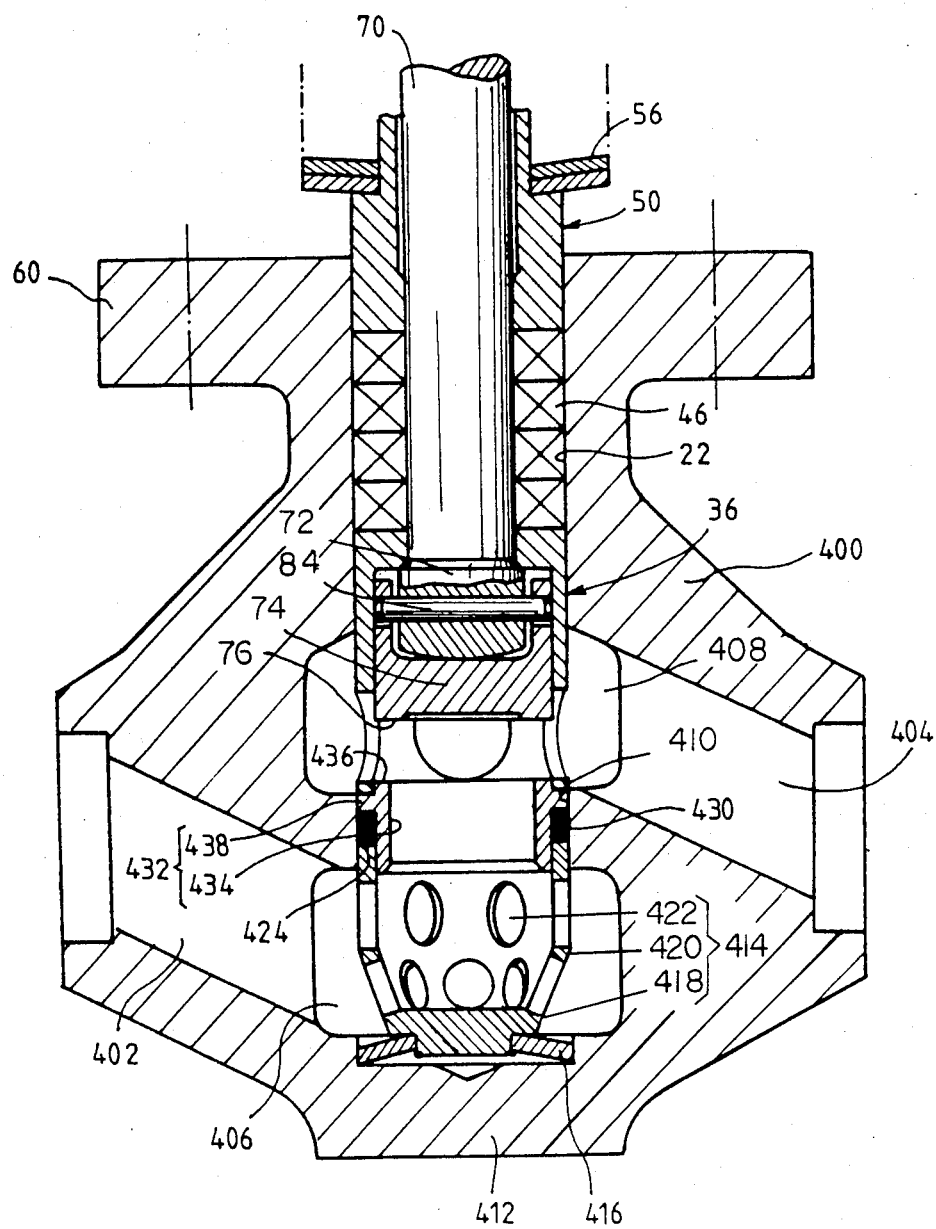
FIG. 4 is a vertical section through a portion of a valve in accordance with the invention and having a two-part cage.

FIG. 4 shows another variant embodiment of a valve in accordance with the invention. In this variant the valve has a two-part cage. In FIG. 4 the top half of the valve is not shown since it is identical to that shown in FIG. 1 or in FIG. 2. FIG. 4 does, however, show the resilient washers 56, the ram 50, the packing 46, and the cage 36 which is now the upper of the two cages. The figure also shows the control rod 70 and the disk 74 which is fixed to the bottom end 72 thereof. All these items are identical to the corresponding items of FIGS. 1 and 2.

The valve additionally includes a body 400 which is made in a single piece and which has an inlet passage 402, and an outlet passage 404 provided therein for the flow of liquid. The inlet passage 402 opens out into a lower cavity 406 while the outlet passage 404 opens out into an upper cavity 408 in which the upper cage 36 is received. The upper and lower cavities 408 and 406 communicate with each other via a cylindrical passage 410 about the axis XX'. The lower cavity 406 has a bottom 412 on which a lower cage 414 rests by means of a resilient washer 416. The lower cage 414 includes a bottom 418 on which the resilient washer 416 is mounted, and a side wall 420 which is cylindrically symmetrical about the axis XX' of the valve. The side wall 420 of the lower cage is provided with orifices 422 and has an upper edge 424. The lower cage 414 is essentially received in the lower cavity 406, but its upper edge 424 is situated in the passage 410 which puts the cavities 408 and 406 into communication with each other. A gasket 430 rests on the top edge 424 of the lower cage 414. The gasket 430 is preferably made of graphite and its outside diameter is substantially equal to the inside diameter of the passage 410.

The valve also includes a seat 432 which of the same shape as the seat 28 shown in FIG. 1. It comprises a cylindrical sleeve 434 whose top face 436 constitutes the seat per se and an outwardly directed collar 438. The seat 432 is shaped in such a manner that the outer face of the sleeve 434 has a diameter which is slightly less than the inside diameter of the gasket 430.

As can be seen in FIG. 4, the lower face of the collar 438 of the seat 432 rests on the top face of the gasket 430, whereas the bottom edge of the top cage 36 rests on the top face of the collar 438.

It can be seen that the top edge 424 of the lower cage 414 constitutes an annular thrust bearing surface and performs exactly the same role as the shoulder 20 of FIG. 2 or the shoulder 300 of FIG. 3. The only functional difference lies in the fact that this thrust bearing surface is not rigidly fixed relative to the valve body because of the resilient washer 416.

The resilient washers 56 are compressed under the effects of the ram plate as transmitted to the upper cage 36 and to the seat 432. As a result, the gasket 430 is compressed. The deformed gasket 430 is pressed against the inside face of the passage 410 and against the outside face of the sleeve 434 of the seat 432, thereby providing sealing.

This embodiment provides two resilient takeup points for any axial play which may exist, firstly by means of the washer 416, and secondly by means of the stack of resilient washers 56.

Figure 5:
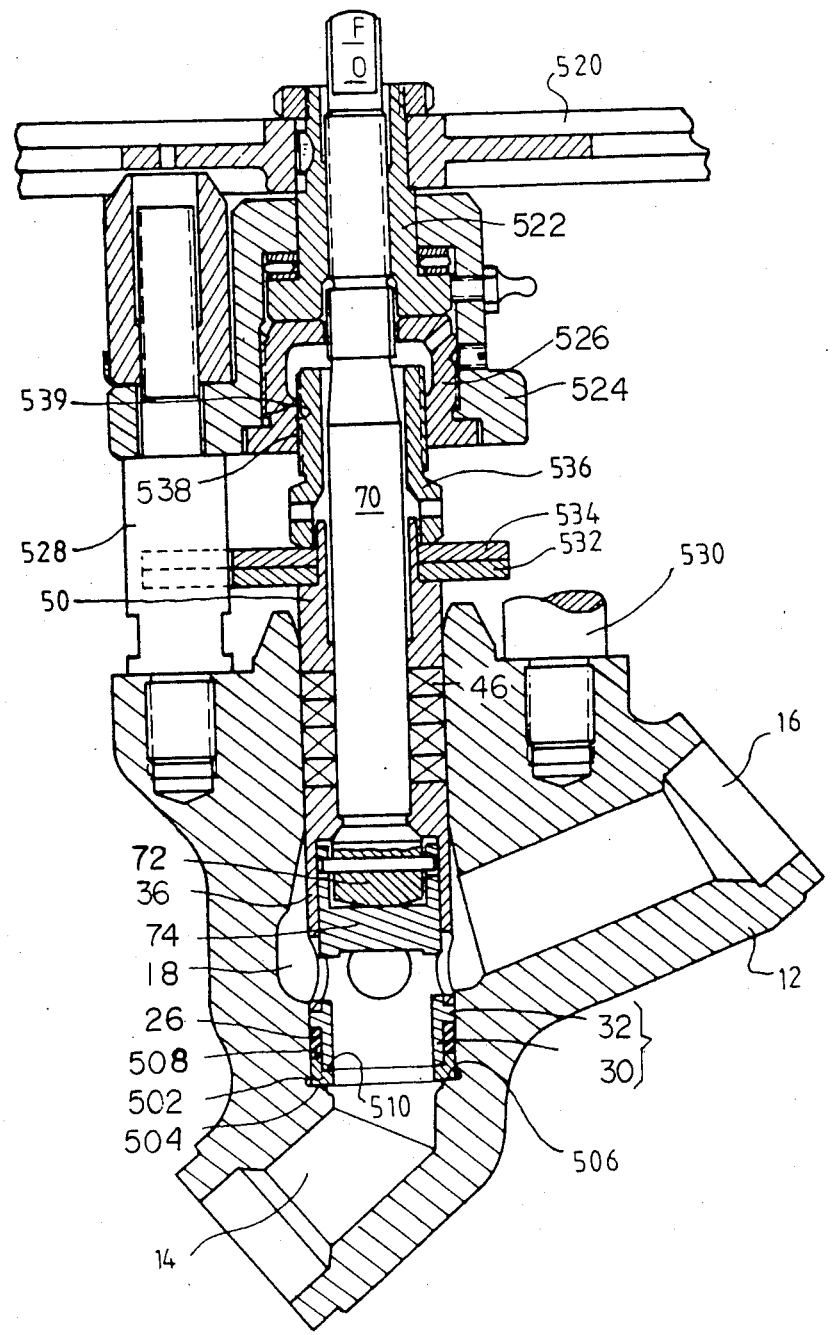
FIG. 5 is a vertical section through a fifth embodiment of a valve in accordance with the invention.

FIG. 5 shows a fifth embodiment of a globe valve in accordance with the invention. In the following description the references used in FIG. 1 are used again in order to identify parts which are common to the valves shown in FIGS. 1 and 5.

The body 12 of the valve defines an inlet duct 14, an outlet duct 16 and a chamber 18. Inside the chamber 18, the valve includes a removable seat 28 constituted by a cylindrical sleeve 30 and an outer collar 32. The cage 36 bears against the collar 32 and is surmounted by packing rings 46 and a ram 50. A disk 74 is displaceable inside the cage 36 and is fixed to the bottom end of a control rod 70.

In this embodiment a sealing gasket 26' is disposed underneath the lower face of the collar 32 of the seat 28. The gasket 26' is preferably of the type made of silver with antiextrusion cups. An annular ring 502 has a lower face 504 resting on an annular bearing surface 506 of the valve body 12 as provided in the bottom of the chamber 28. The upper face of the ring 52 defines an outside upper bearing surface 508 and an inside lower bearing surface 510. The bottom end of the sleeve 30 of the seat 28 comes into contact with the lower bearing of the sleeve 30 of the seat 28 comes into contact with the lower bearing surface 510 of the ring 502, with the lower bearing surface 510 thus forming a fourth thrust bearing surface suitable for co-operating with the bottom end of the valve seat. Thus, when the stack constituted by the seat 28, the cage 36, the packing ring 46 and the ram 50 is compressed, the seat 28 abuts against the ring 502. As a result the gasket 26' is compressed between the collar 32 and the outside upper bearing surface 508 of the ring 502 with a high degree of precision.

If the upper portion of FIG. 5 is taken into consideration, it can be seen that the control rod 70 is actuated by an assembly constituted by a wheel 520 which is fixed to a threaded thimble 522. The thimble 522 is free to rotate in an assembly which is essentially constituted by parts 524 and 526 screwed together. The assembly of parts 524 and 526 is fixed to the body 12 of the valve by tie-rods such as 528 and 530.

The ram 50 has resilient members 532 and 534 mounted on the top thereof and a clamping nut 536 acts thereon. The upper portion 538 of the nut 536 is threaded to co-operate with a tapped portion 536 of the part 526. The nut 536 acts on the stack of parts running from the resilient members 532, 534 to the seat 28. The effect of the nut is to bring the bottom end of the seat 28 into abutment against the ring 502, and to compress the sealing rings 46.

It should be added that the outside diameter of the end 72 of the control rod 70 is greater than the outside diameter of the bore 44 provided through the cage 36.

Thus, each time the rod 70 is raised to its upper position by means of the wheel 520, the cage 36 is "imperceptibly" lifted which provides additional clamping of the packing ring 46 closest to the cage 36, i.e. of that part of the packing 46 which is in contact with the fluid. Sealing is thus further improved.

It follows from the above description of five preferred embodiments of a valve in accordance with the invention that maintenance thereof is simplified.

In all the cases described the seat is removable. It is thus possible to remove it from the body of the valve and to inspect it and maintain it in a workshop, which need no longer be on site.

Replacing the seat makes it possible, in particular, to use new types of sealing surfaces characterized by new pairs of materials or new shapes (cone-sphere, cone-cone, or portions of circular planes).

The head and the seat may be easily and quickly dismounted from the rest of the valve without using special tools. Heads and seats which have become worn in use may be interchanged for heads and seats which have been prepared in a workshop rather than on site.

This is in contrast with known valves of the same general type, in which the cap is directly screwed to the body of the valve. This solution makes it possible to use static seals, and sealing is provided between the body and the cap of the valve by means of respective lips on the body and on the cap, which lips are welded together. Disassembling such a valve on site therefore requires difficult and lengthy operations such as grinding and welding.

Finally, there is no hard deposit of cobalt or of any other body on the inside walls of the valve, thereby avoiding any risk of the liquid entraining particles which could be activated when the valve is mounted in the primary circuit of a nuclear reactor.

Because of its metallurgical connection with the metal of the valve body, this type of deposit behaves in a random manner when subjected to thermal shock.

I claim:

1. A globe valve comprising:
    a control rod which is movable in translation along a valve axis, handle means for controlling movements of said rod in translation, a valve disk fixed to one end of said rod;
    a body constituted by a single part having an inlet passage and an outlet passage therethrough for passing a fluid to be controlled by said valve disk, said passages giving access to a cavity which is extended via a cylindrical orifice disposed along said valve axis in order to receive said rod;
    a cage lodged inside said cavity and within which said valve disk is capable of being moved by axial displacement of said rod;
    packing surrounding a portion of said rod and disposed within said cylindrical orifice, said packing being in contact with said rod and the wall of said cylindrical orifice and being supported by said cage;
    a seat which is removable from said body for co-operating with said valve disk in a closure position, said seat having a first face defining a sealing bearing surface for co-operating with said valve disk and a first annular thrust bearing surface, and a second face defining a second annular thrust bearing surface;
    means for defining a third annular thrust bearing surface symmetrically around said valve axis and disposed in said cavity between the opening of said passages and at least substantially fixed relative to said body, said second and third annular thrust bearing surfaces being inclined with respect to said valve axis;
    means for providing sealing directly between said second and third annular thrust bearing surfaces, said sealing means and said second and third thrust bearing surfaces cooperating together to provide a substantially complete axial and radial seal between said second and third thrust bearing surfaces, the size of said cage, said seat, and said sealing means being less, in planes perpendicular to said valve axis, than the diameter of said cylindrical cavity; and
    compression means, said compression means acting on a stack having the same axis as said valve and consisting in: said packing, said cage, said seat, and said sealing means, whereby said packing and said sealing means are both subjected to said compression in order to provide sealing respectively between said rod and said wall of the cylindrical orifice, and between said seat and said body, and whereby said packing may be removed from said body by said cage, said valve disk and said rod being movable by axial displacement of said rod so that said seat may be serviced.

2. A globe valve according to claim 1, wherein said body is constituted by a single part, and wherein the size of said cage, said seat, and said sealing means is less, in planes perpendicular to the axis of said valve, than the diameter of said orifice extending said cavity provided inside the valve body.

3. A globe valve according to claim 1, wherein said means for forming said third annular thrust bearing surface are constituted by a shoulder on said body inside said cavity, and wherein said sealing means comprise a gasket interposed between said second and third annular thrust bearing surfaces.

4. A globe valve according to claim 3, wherein said cage is formed by a base having an orifice therethrough to pass said rod and a side wall having orifices therethrough for passing the liquid, said valve disk being capable of sliding therein, said side wall including a free edge at the opposite end from said base, said edge being applied against said first annular thrust bearing surface, and said packing resting on the outer face of said base.

5. A globe valve according to claim 4, wherein said compression means comprises a plate having an orifice for passing said rod, means for fixing said plate to said body, a stack of resilient washers surrounding said rod, and a packing ram surrounding said rod, said resilient washers being interposed between said plate, and said packing ram, and said packing ram being interposed between said resilient washers and said packing.

6. A globe valve according to claim 4, wherein said means for fixing said plate comprise at least two tiebars disposed parallel to said control rod and each having a first end fixed to a flange which is an integral part of said valve body, a threaded middle portion passing through holes provided in said plate, and at least two nuts, each nut being in contact with that face of said plate which is not in contact with said resilient washers.

7. A globe valve according to claim 1, wherein said means for forming said third annular thrust bearing surface are constituted by a shoulder in said body inside said cavity, and wherein said sealing means comprise ribs provided in said second annular bearing surface of said seat.

8. A globe valve according to claim 1, and further comprising a second cage lodged in a second cavity provided in said valve body, said second cavity communicating with said cavity via a cylindrical passage, said second cage having a free edge disposed in said cylindrical passage an forming said third annular thrust bearing surface, wherein said sealing means comprise an annular gasket lodged in said cylindrical pasage and resting on said free edge.

9. A globe valve according to claim 8, in which said second cage includes a base at the opposite end to said free edge, said base of said second cage resting against a wall of said second cavity via a resilient system.

10. A globe valve according to claim 1, wherein the means for creating said third thrust bearing surface are fixed relative to said valve body, said valve further comprising means for providing a fourth thrust bearing surface which is fixed relative to said valve body so that said seat abuts against said fourth thrust bearing surface under the effect of the compression means, whereby compression of the sealing means between said second and third thrust bearing surfaces is limited by the cooperation between said seat and said fourth thrust bearing surface.

* * * * *